United States Patent [19]

Jackson et al.

[11] Patent Number: 4,965,331

[45] Date of Patent: Oct. 23, 1990

[54] CURABLE RESIN COMPOSITIONS

[75] Inventors: Roy J. Jackson; Anthony M. Pigneri, both of Houston, Tex.

[73] Assignee: Shell Oil Company, Houston, Tex.

[21] Appl. No.: 471,032

[22] Filed: Jan. 26, 1990

Related U.S. Application Data

[63] Continuation of Ser. No. 312,839, Feb. 21, 1989, abandoned.

[51] Int. Cl.$^5$ .............................................. C08F 22/40
[52] U.S. Cl. .................................... 526/262; 526/285; 526/333
[58] Field of Search ........................ 526/262, 285, 333

[56] References Cited

U.S. PATENT DOCUMENTS 4,298,720  11/1981  Yamazaki et al. ................... 526/262
4,371,719  2/1983   Zahir et al. ........................... 568/723

FOREIGN PATENT DOCUMENTS 54-102389  8/1979  Japan .

*Primary Examiner*—Joseph L. Schofer
*Assistant Examiner*—Alex H. Walker

[57] ABSTRACT

New curable resin compositions comprise a (bis- or poly)-maleimide and a propargyl aromatic ether.

7 Claims, No Drawings

CURABLE RESIN COMPOSITIONS

This is a continuation of application Ser. No. 312,839 filed Feb. 21, 1989 now abandoned.

BACKGROUND OF THE INVENTION

1. Field of the Invention

The present invention relates to new curable resin compositions comprising a maleimide and a propargyl aromatic ether.

2. State of the Art

A variety of maleimide resins or maleimide blend resins are known in the art for use as matrix resins for fiber reinforced composites, particularly for electrical and electronic applications. For example, blends of maleimides and cyanate aromatic esters are well known. However, it is still desirable to have new resins with improved glass transition temperatures, lower dielectric constants and/or lower moisture sensitivities.

SUMMARY OF THE INVENTION

The present invention is directed to a curable resin composition comprising:

(a) a maleimide monomer, a prepolymer thereof or a prepolymer of a maleimide and an amine; and (b) a propargyl aromatic ether monomer.

The compositions of the invention are useful for composites and the like and can be quite thermally stable and curable without a catalyst to give glass transition temperatures as high as 280°–305° C.

The maleimide component of the curable resin composition of this invention, hereinafter referred to as component (a) is selected from maleimides, prepolymers thereof and prepolymers of the maleimides and amines.

The maleimides employed in the present invention are conventional organic compounds known in the art and include those compounds having two or more maleimide groups derived from maleic anhydride and diamines or polyamines. Suitable maleimides are represented by the following general formula (1)

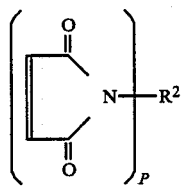
(1)

wherein P is 2 to 4 and $R^2$ is a divalent aromatic (aryl), aliphatic or alicyclic organic group containing about 1 to 50 carbon atoms. Suitable bismaleimides are represented by the formula (2)

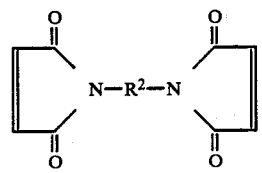
(2)

wherein $R^2$ is a divalent aromatic (aryl), aliphatic or alicyclic organic group containing about 2 to about 40 carbon atoms.

Examples of the divalent organic group $R^2$ in the formulas (1 or 2) include (i) aromatic, aliphatic or alicyclic hydrocarbon groups containing about 3 to about 20 and, preferably, 6 to 16 carbon atoms, such as isopropylidene, phenylene, naphthylene, xylene, cyclohexylene or hexahydroxylene, and (ii) organic groups consisting of a plurality of a plurality of aromatic rings bonded to each other directly or through a bridging atom or group, for example, those expressed by the following formula (3)

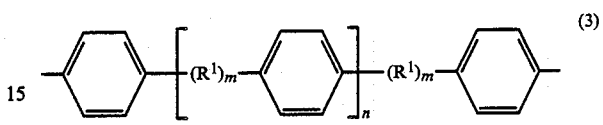
(3)

wherein each m is independently zero or 1; n is zero or 1; and each $R^1$ is independently a divalent aliphatic or aromatic hydrocarbon or aromatic ether group, containing up to about 14 carbon atoms, an oxygen atom, a sulfur atom, a carbonyl group, or sulfonyl group, a sulfinyl group, an alkyleneoxyalkylene group containing up to 4 carbon atoms in each alklylene group, an amino group,

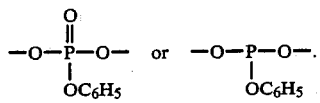

In formulas (1 or 2), the divalent organic group $R^2$ can contain an organic group which does not participate in the reaction, such as an alkyl group containing 1 to 4 carbon atoms (e.g., methyl or ethyl), or an alkoxy group containing 1 to 4 carbon atoms (e.g., methoxy or ethoxy), at the aromatic ring when it is an aromatic organic group or at the alicyclic ring when it is an alicyclic organic group. Preferably, the maleimide is bismaleimide of methylene dianiline.

The maleimide can be prepared by a method known per se which comprises reacting maleic anhydride with diamines or polyamines containing up to about 24 carbon atoms, and then cyclodehydrating the resulting maleamide acids. The diamines and polyamines are preferably aromatic diamines in view of the thermal stability of the final resins. When it is desired to improve the flexibility or suppleness of the resin, alicyclic diamines or polyamines can be used alone or in combination with the aromatic diamines or polyamines. From the viewpoint of reactivity, the diamines are preferably, and especially primary diamines, but secondary diamines or polyamines can also be used. Examples of suitable diamines are m-phenylene diamine, m-, or p-xylylenediamine, 1,4-cyclohexane diamine, hexahydroxylylene diamine, 4,4'-bisaminophenyl methane, 4,4'-bisaminophenyl sulfone, bis(4-amino-3-methylphenyl) methane (MDT), bis(4-amino-3,5-dimethylphenyl)methane (MDX), 4,4'-bisaminophenylcyclohexane, 4,4'-bisaminophenyl ether, 2,2-bis(4'-aminophenyl)propane, 2,2-bis(4-amino-3-methylphenyl)methane, and α,α'-bis(4-aminophenyl)phenylmethane, α,α'-bis(4-aminophenyl)-p-diisopropylbenzene and the like.

Polyamines suitable for use in the invention includes hexamethylene tetramine, polyethylene imine, polyamino styrene or polyvinyl imidazole; triethylene diamine; imidazoles such as 2-methylimidazole, 2-undecylimidazole, 2-heptadecylimidazole, 2- phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole or 1-guanaminoethyl-2-methylimidazole, and adducts formed between these imidazoles and trimellitic acid and the like.

The maleimide can be used either alone or in admixture of two or more.

Prepolymers of the maleimides, and, preferably prepolymers of the maleimides and amines can also be used as component (a).

As already stated, an amine can be incorporated in the form of a prepolymer of the maleimide and the amine as component (a). Examples of the amines that can be used in this invention include (i) diamines of the general formula (4)

$$H_2N-R^3-NH_2 \qquad (4)$$

wherein $R^3$ is a divalent aromatic or alicyclic organic group, especially those illustrated with regards to the production of maleimides, and (ii) polyamines such as bisaminobenzylaniline, hexamethylene tetramine, polyethylene amine, polyamino styrene or polyvinyl imidazole; triethylene diamine; imidazoles such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole or 1-guanaminoethyl-2-methylimidazole, and adducts formed between these imidazoles and trimellitic acid.

When the above-mentioned amines are used in the form of a prepolymer with maleimides, the prepolymer can be produced by reacting the maleimide and the amine, especially 1 mol of the maleimide and ½ to 1 mol of the diamine, in a suitable solvent such as ketones under the known conditions, for example, by heating at a temperature of about 40° to 250° C. for 5 minutes to 5 hours. The prepolymer derived from the maleimide and the diamine, although differing according to the ratio of the monomers or the degree of polyaddition, are considered to have the structure represented by the following formula (5)

(FORMULA 5)

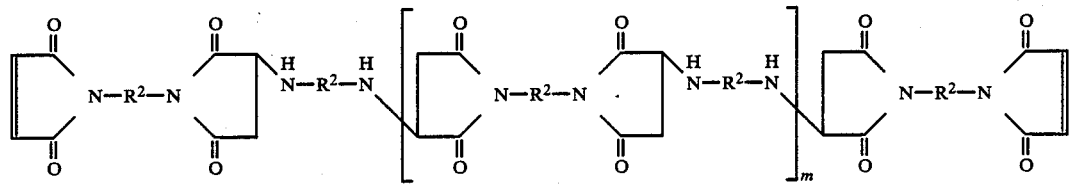

wherein m is zero or a positive number, generally not more than 10, and $R^2$ is the same as defined hereabove.

In the case of adding amines in the form of prepolymers, it is of course permissible to cause free amines to be present in the composition.

When the amines are included as component (a) in the form of a prepolymer, they are considered to function mainly as a modifier for polymer such as a chain extender.

Suitable maleimides for component (component a) are disclosed in U.S. Pat. No. 4,110,364, 4,298,720 and the like, which are incorporated herein by reference.

The propargyl aromatic ethers useful as component (b) in the present inventions are compounds having at least two propargyl ether groups directly attached to an aromatic (aryl) organic group. Suitable di- and poly propargyl aromatic ester monomers include those represented by the formula (6)

$$R-(OCH_2-C\equiv CH)_n \qquad (6)$$

wherein n is number of at least from 2 to about 10, R is an aromatic (aryl) organic group containing 6 to about 100 carbon atoms comprising an aromatic ring or an aromatic ring (a) bonded directly or through a bridging atom or group to or (b) fused to one or more aromatic or cycloaliphatic rings, each aromatic ring of R having from one to all the available ring positions independently substituted by propargyl ether groups. Suitable aromatic organic groups for R, include (i) residues having a valence of at least 2 and derived from an aromatic hydrocarbon or aromatic ether group containing 6 to 16 carbon atoms, such as benzene, naphthalene, anthracene or pyrene;

(ii) organic groups consisting of a plurality of aromatic rings bonded directly or through a bridging atom or group, for example, those expressed by the following formula (3)

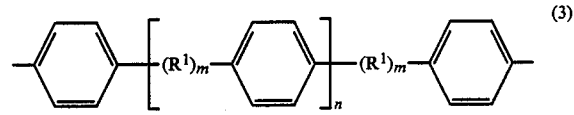

wherein each m is independently zero or 1; n is zero or 1; and each $R^1$ is independently a divalent aliphatic or aromatic hydrocarbon aromatic ether group containing up to 14 carbon atoms, an oxygen atom, a sulfur atom, a carbonyl group, a sulfonyl group, a sulfinyl group, an alkyleneoxyalkylene group containing up to 4 carbon atoms in each alkylene group, an imino group,

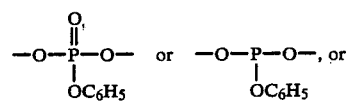

(iii) groups derived from novolac-type phenol or resorcinol resins.

These aromatic organic groups R and $R^1$ can be substituted on their aromatic ring by a substituent which does not participate in the reaction, such as an alkyl group containing 1 to 4 carbon atoms (e.g., methyl or ethyl), alkoxy groups containing 1 to 4 carbon atoms (e.g., methoxy or ethoxy), a halogen atom (e.g., chlorine or bromine), or a nitro group and the like.

Examples of suitable organic groups of the general formula (2) are those derived from biphenyl diphenylmethane, α,α-dimethylphenylmethane, diphenyl ether, diphenyl dimethylene ether, diphenyl thioether, diphenyl ketone, diphenylamine, diphenyl sufoxide, diphenyl sulfone, triphenyl phosphite and triphenyl phosphate and the like.

Generally, the propargyl aromatic ether monomers can be prepared by known methods including reacting a di- or polyhydric phenolic material with a propargyl halide, such as chloride or bromide, in an aqueous alkaline solution, such as aqueous sodium hydroxide solution as described in U.S. Pat. No. 4,226,800, the disclosures of which are incorporated by reference. One preferred method is by using propargyl chloride in (aqueous) sodium hydroxide and a water-miscible, protic solvent or co-solvent, which is disclosed and claimed in filed U.S. patent application Ser. No. 271,133, filed Nov. 14, 1988, now abandoned, the disclosures of which are incorporated by reference. Propargyl aromatic ethers which are readily available and preferred in this invention in view of the properties of the final resin obtained are those prepared by reacting a dihydric phenol, such as bisphenol A with a propargyl chloride or bromide. Likewise propargyl aromatic ethers obtained by the reaction of a phenolformaldehyde precondensate with a propargyl chloride or bromide can advantageously be used.

The components of the curable resin composition of this invention can be varied over a wide range. Generally, however, the ratio by weight of component (a) to component (b) is in the range of from about 1:99 to about 99:1, preferably from about 70:30 to about 30:70, and most preferably from about 70:30 to about 40:60. Ratios are conveniently about 50:50. When preparing heat resistant resin having good toughness, from about 10% by weight to about 90% by weight of component (a), preferably about 10% to about 50% by weight, is used on the basis of total weight of components (a) and (b).

The curable composition of this invention comprises a mixture of components and each component can be used in any desired form such as solid, solution or dispersion. These components are mixed in solvent or in the absence of a solvent to form the compositions of this invention. For example, the mixing procedure comprises mixing solutions of component (a) and component (b) either separately or together in a suitable inert organic solvent, such as for example, ketones such as methyl ethyl ketone, chlorinated hydrocarbons such as methylene chloride, ethers and the like, and homogenizing the resulting mixed solution at room temperature or at an elevated temperature below the boiling point of the solvents to form a composition in the form of a solution. When homogenizing these solutions at room temperature or at an elevated temperature, some reactions may take place between the constituent elements. So long as the resins components are maintained in the state of solution without gelation, such reactions do not particularly affect the operability of the resulting composition in, for example, a bonding, coating, laminating or molding operation.

The curable resin compositions of invention can be used in the above solution form as adhesives, paint vehicles, molding materials, to be impregnated in substrates, or laminating materials. In this case, the concentration of the resin solid in the solution is determined so that the optimum operability can be obtained according to the desired utility.

The resin compositions of this invention can be used for various purposes in the form of dried powder, pellets, resin-impregnated product or compound. For example, compositions with the individual components uniformly mixed can be obtained by uniformly mixing the resin components in solution, and then removing the solvents from the homogeneous solution at reduced pressure or at an elevated temperature. Alternatively, solids components (a) and (b) are kneaded at room temperature or at an elevated temperature to form a homogenized resin composition.

The curable composition of this invention may be reticulated by heating it alone to form a cured resin having heat resistance. In general, a catalyst can be used in order to promote crosslinking reaction of the components in the composition, when desired.

Examples of the catalysts include imidazoles, such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as diaminobicyclooctane, N,N-dimethyl benzylamine, N,N-dimethylaniline, N,N-dimethyltoluidine, N,N-dimethyl-p-anisidine, p-halogeno-N,N-dimethyl-aniline, 2-N-ethylanilino ethanol, tri-n-butylamine, pyridine, quinoline, N-methylmorpholine, triethanolamine, triethylenediamine, N,N,N',N'-tetramethylbutanediamine, N-methylpiperidine; phenols, such as phenol, cresol, xylenol, resorcinol, and phloroglucin; organic metal complexes or salts, such as copper tetrafluoroborate, lead naphthenate, lead stearate, zinc naphthenate, zinc octoate, tin oleate, dibutyl tin maleate, manganese naphthenate, cobalt naphthenate, and acetyl acetone of nickel or iron, tetrakis(triphenylphosphine)palladium O, bis(triphenylphosphine)palladium II chloride, bis(1,2-diphenylphosphino)ethane nickel II chloride, and inorganic metal complexes or salts, such as molybdenum carbonyl, stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, fumaric anhydride, pyromellitic anhydride, trimellitic anhydride, hexahydrophthalic anhydride, hexahydropyromellitic anhydride and hexahydrotrimellitic anhydride; azo compounds, such as azoisobutylonitrile, 2,2'-azobispropane, m,m'-azoxystyrene, hydrazones, and mixtures thereof. The amount of catalyst varies considerably according to the type of catalyst, the utility or during conditions. They can, however, be used in catalytic amounts such as, for example, less than 5% by weight of the total composition.

A variety of additives may be added to the curable composition to impart specific properties provided that they do not impair the essential properties of the resulting resin. Examples of the additives include natural or synthetic resins, fibrous reinforcement, fillers, pigments, dyestuffs, thickening agents, wetting agents, lubricants, flame-retardants and the like.

The resin composition of this invention can also contain a white pigment such a titanium dioxide, a colored pigment such as yellow lead, carbon black, iron black, molybdenum red, prussian blue, ultramarine, cadmium yellow or cadmium red, and other various organic and inorganic dyes and pigments in order to color the compositions. In addition to the above colored pigments, the resin compositions can also contain a rust-proofing pigment such as zinc chromate, red lead, red iron oxide, zinc flower or strontium chromate, an anti-sag agent such as aluminum stearate, a dispersing agent, a thickener, a coat modifier, a body pigment or a fire retardant, which are known additives for paints.

The compositions of this invention are cured by heating after applying it to a substrate as a coating or adhesive layer, or after molding or laminating in the form of powder, pellet or as impregnated in a substrate. The curing conditions of the curable composition of this invention depend on the proportion of components constituting the composition and the nature of the components employed. In general, the composition of this invention may be cured by heating it at a temperature within the range of about 0°-300° C., preferably about 100° C.-250° C., although differing according to the presence of a catalyst or curing agent or its amount, or the types of the components in the composition. The time required for heating is generally 30 seconds to 10 hours, although considerably differing according to whether the resin composition is used as a thin coating or as molded articles of relatively large thickness or as laminates or as matrix resins for fiber reinforced composites, particularly for electrical and electronic applications, e.g. when applied to an electrically conductive material, e.g., copper or the like, and subsequently curing the composition. Suitable fibrous reinforcing materials include glass fibers, quartz fibers, carbon fibers, boron fibers, Kelvar fibers, Telflon ® fibers and the like, with woven or continuous glass fibers or carbon fibers being preferred. The fibrous or reinforcing material is present in the composition in an amount effective to impart increased strength to the composition for the intended purpose, generally about 40 to about 95 w percent, usually about 50 to about 85 w percent, based on the weight of the total composition. When the resin composition of this invention is used for producing molded articles, laminated articles or bonded structures, the curing is desirably effected under pressure. Generally, this pressure is from 10 to 100 Kg/cm² (gauge).

The composition of this invention cures rapidly, even under mild conditions, so is especially suitable when quantity production and ease of workability are desired. The cured resin made from the composition not only has excellent adhesive force, bond strength, heat resistance, and electric properties, but also is excellent in mechanical properties and resistance to impact, chemicals, moisture and the like. The composition of this invention has a variety of uses as a coating material for rust prevention, flame resistance, flame retardance and the like; as electrical insulating varnish; as adhesive; in laminates to be used for furnitures, building materials, sheathing materials, electrical insulating materials, and the like; and in a variety of moldings.

ILLUSTRATIONS EMBODIMENTS

The present invention is further illustrated by the following examples which are not intended to be construed as limitations upon the invention.

EMBODIMENT 1

In order to demonstrate the ability to cure blends containing the bismaleimide of methylene dianiline resin and BPA-dipropargyl ether, two grams each of the components were placed in a container with a stirring bar and on a hot plate. The mixture was raised to the melting point of the BPA-propargyl ether and the temperature maintained until a homogeneous mixture was obtained. The mixture was then placed in an oven at 200° C. for 2 hours. Surprisingly the mixture showed 97.5 retention of its weight. Under similar conditions, a sample containing only BPA-dipropargyl ether lost up to 50% of its weight. The partially cured mixture was then examined by use of a differential scanning calorimeter (DSC) and was found to have an additional exotherm at 265° C. Final cure was effected by a 20 minute hold at 275° C. in the DSC. The Tg was found to be 281° C.

EMBODIMENT 2-LAMINATE

A varnish solution was prepared containing a 75:25 blend of bismaleimide of methylene dianiline resin (20 grams in 13.3 ml of dimethyl formamide) and bisphenol acetone dipropargyl ether (6.67 grams in 4.44 ml of acetone) in acetone (4.45 ml of additional solvent to that from the resin solutions). The varnish was catalyzed by 1 gram of a 10% solution of 2 methyl imidazole in methyl oxitol. The varnish gel time was 168 seconds.

The varnish solution was coated on 7628 glass cloth and advanced to a "B" stage by exposure for 3.25 minutes in a forced air oven at 163° C. The "B" staged prepregs were cut and stacked into 8 and pressed into laminates for 1 hour at 180° C. and 25 PSI pressure. the laminate was postcured for 4 hours at 250° C. and 2 hours at 300° C. The cured laminate had the following properties:

| | |
|---|---|
| Tg (maximum in the damping peak by DMA)[1] | 324.6° C. |
| 5% weight loss by TMA[2] | 420° C. |
| Coefficient of thermal expansion by TMA 50° C.–250° C. | 46.6 |

[1]Dynamic Mechanical Analyzer.
[2]Thermal Mechanical Analyzer.

What is claimed is:
1. A curable resin composition comprising
    (a) a maleimide monomer, a prepolymer thereof or a prepolymer of a maleimide and an amine; and
    (b) a dipropargyl ether of bisphenol A.
2. A composition according to claim 1 wherein (a) is a bismaleimide and has the formula (1)

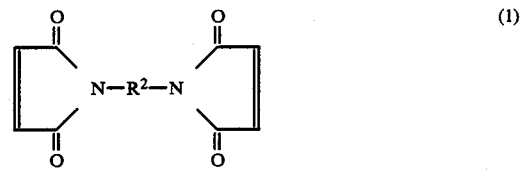

wherein R² is a divalent aromatic, aliphatic or cycloaliphatic group containing 2 to 40 carbon atoms.
3. A composition according to claim 1 wherein (a) is a prepolymer of a bismaleimide and an amine.
4. A composition according to claim 3 wherein (a) is the bismaleimide of methylene dianiline.

5. A composition according to claim 3 wherein the ratio by weight of component (a) to component (b) is in the range of about 70:30 to about 30:70.

6. A composition according to claim 3 wherein the ratio by weight of component (a) to component (b) is in the range of about 70:30 to about 40:60.

7. A composition according to claim 4 wherein the ratio by weight of component (a) to component (b) is about 50:50.

* * * * *